July 20, 1965  L. D. HEUBACH  3,195,746
HAY HARVESTER, LOADER AND UNLOADER
Filed Sept. 12, 1961  2 Sheets-Sheet 1
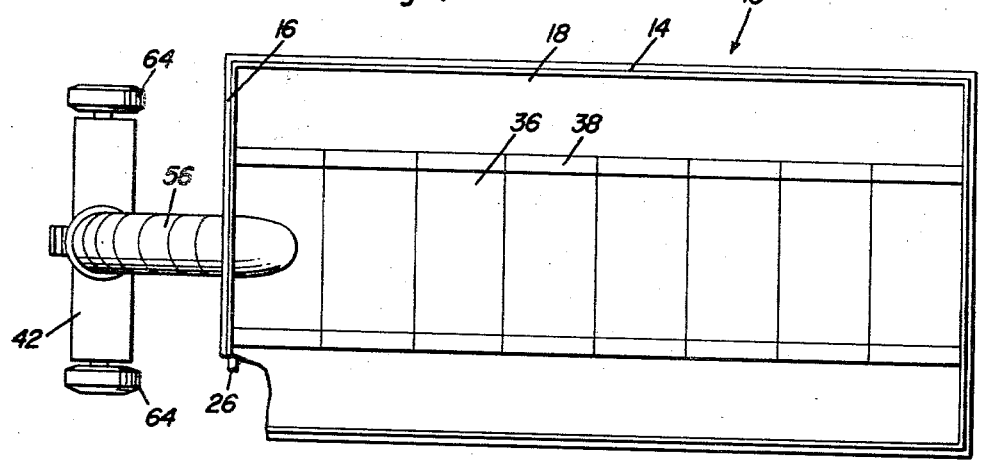
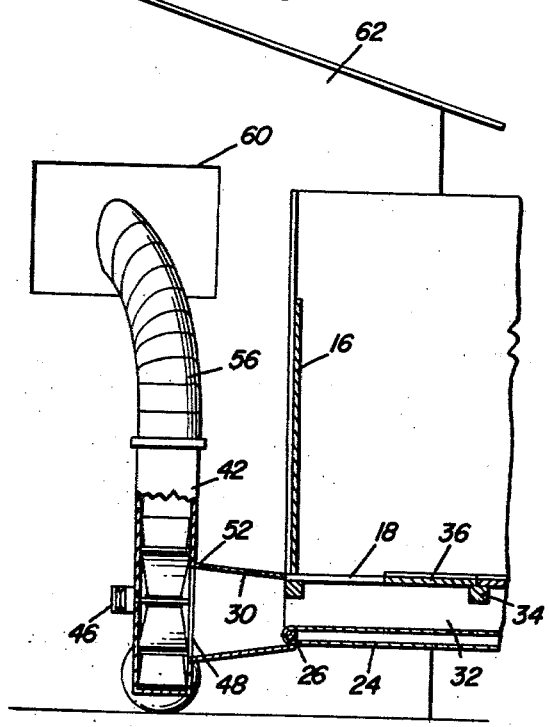
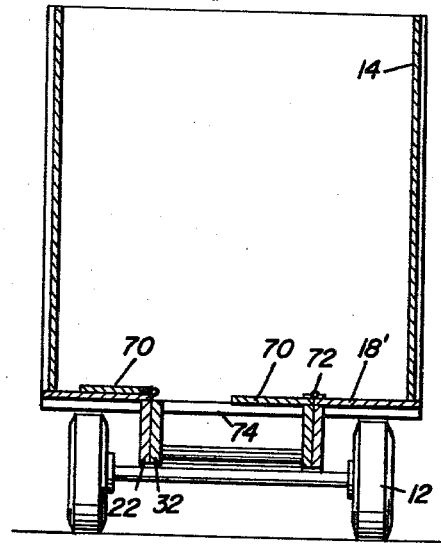
Leslie David Heubach
INVENTOR.

July 20, 1965 L. D. HEUBACH 3,195,746
HAY HARVESTER, LOADER AND UNLOADER
Filed Sept. 12, 1961 2 Sheets-Sheet 2
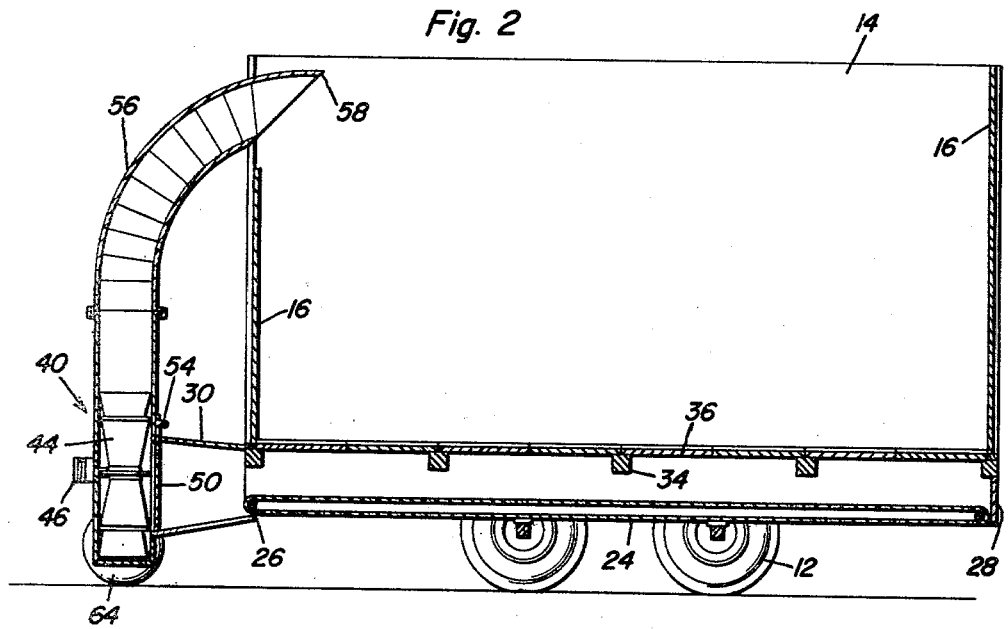
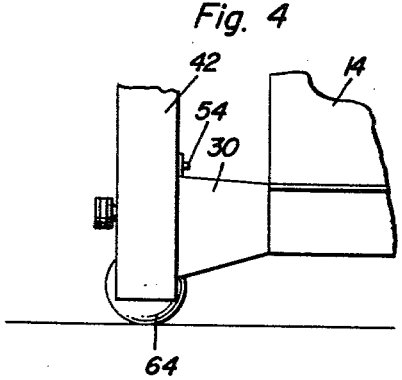
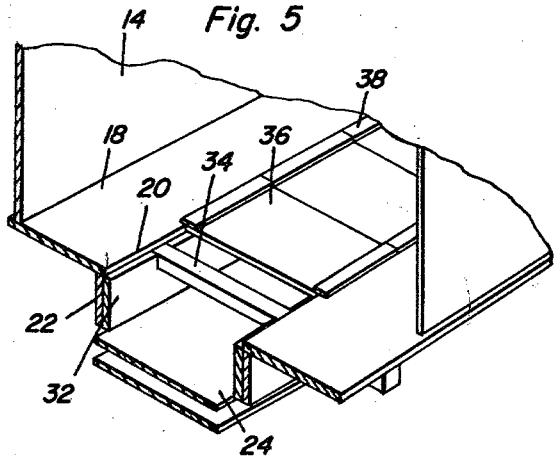
Leslie David Heubach
INVENTOR.

United States Patent Office 3,195,746
Patented July 20, 1965

3,195,746
HAY HARVESTER, LOADER AND UNLOADER
Leslie David Heubach, Rte. 4, Elmira, Ontario, Canada
Filed Sept. 12, 1961, Ser. No. 137,567
5 Claims. (Cl. 214—83.28)

The present invention generally relates to a handling device and may be referred to as a "drive-in haymaker."

The primary object of the present invention is to provide a hay loading and unloading device in which the unloading device employs a pneumatic conveyor or suction tunnel unloader incorporated into the bottom of a wagon by providing an elongated suction tunnel communicated with the load carrying area of the wagon by virtue of a plurality of movable panels for selectively communicating different areas of the body with the suction tunnel whereby hay, straw or any other light material may be unloaded from the load carrying area by virtue of a blower provided at the forward end of the wagon. For heavier material such as corn and grass silage, a slatted belt or travelling floor conveyor may be employed for assisting the air in the tunnel in order to handle the heavier material and convey it to the blower. If the load carrying body is employed for use in hauling grain, cob corn or the like, a belt or other type of conveyor would be used without the blower and without using the pneumatic suction feature to unload into an elevator or grain auger either at the front or rear of the load carrying body. Thus, the device will operate effectively as a pneumatic conveyor with only the blower operating in certain instances, as only a conveyor with only the mechanical conveyor operating with the blower remaining inoperative and will operate as a combined pneumatic and mechanical conveyor when both the blower and the conveyor assembly are operative.

A very important object of the present invention is to provide a hay unloader in the form of a wagon body or trailer box having a tunnel extending longitudinally under the floor thereof together with a plurality of movable panels forming a closure for the tunnel and also being movable to an openable position for communicating selective areas of the box with the tunnel whereby material may be pulled through the opening in the bottom of the box, into the tunnel and longitudinally thereof for discharge into a storage area or the like by the use of a pneumatic blower disposed at the forward end of the load carrying box, the blower also serving to pick up the material, shred it and discharge it into the load carrying box by using any suitable type of pick up mechanism for feeding the material into the blower with the blower construction being such that it will also serve to shred the hay as it is discharged into the load carrying box.

Another important object of the present invention is to provide a hay unloader attachment for a wagon or a trailer load carrying body which may be employed for various purposes and is generally inexpensive to manufacture, efficient in operation and efficient in its many uses.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the load carrying body of the present invention with the pneumatic blower mounted forwardly thereof;

FIGURE 2 is a longitudinal, sectional view of the assembly of the present invention;

FIGURE 3 is a longitudinal sectional view illustrating the blower in the position in which it would unload the material from the wagon body;

FIGURE 4 is a detailed side elevational view of the connection between the wagon body or trailer body and the blower;

FIGURE 5 is a fragmental perspective view illustrating the structure of the bottom of the trailer body or box; and FIGURE 6 is a transverse sectional view illustrating a modified form of the invention in which hinged panels are provided in the bottom of the trailer body.

Referring now specifically to the drawings, the numeral 10 generally designates the load carrying wagon or trailer of the present invention which may be of any suitable construction as far as the supporting wheels 12 and undercarriage is concerned. The trailer or body 10 includes upstanding side walls 14 and upstanding end wall 16. Conventional unloaders have a movable end wall which is manually or mechanically moved longitudinally of the body for causing ejection of the material therein. In this invention, the end walls are stationary and there is a bottom or floor 18 provided that is rigid with the end and side walls.

Disposed centrally in the bottom 18 is a longitudinal opening 20 defined by depending side wall members 22 and a conveyor belt 24 forms the bottom of the longitudinal opening 20, the conveyor belt 24 being entrained over end rollers 26. The rear end of the space between the bottom 18 and the conveyor belt 24 is closed by a closure member 28 whereby the tunnel or longitudinal recess is substantially closed except at the forward end thereof where it is communicated with a forwardly extending housing 30 of hollow construction.

In the form of the invention illustrated in FIGURE 5, a pair of ledge forming members 32 are provided in the interior of the tunnel and these ledges are supported by transverse members 34 for retaining the ledges 32 in spaced condition. Forming a closure for the tunnel is a plurality of panels 36 slidable on the top edges of the ledge forming members 32 and retained thereon by strap members 38 overlying the edges of the panels 36. Thus, the panels 36 may be moved longitudinally for opening a predetermined portion of the tunnel 20. A portion of the strips 38 may be omitted to enable removal of one of the panels 36 so that the other panels may be moved longitudinally for forming an opening or the bottom structure may be formed with one of these panels 36 omitted thus enabling a restricting area of the tunnel to be opened or communicated with the interior of the load carrying body thus forming a high velocity of air movement for conveying lightweight material such as hay, straw or the like longitudinally of the tunnel 20 by virtue of the blower assembly generally designated by numeral 40. Thus, with this construction, the hay, straw or the like may be conveyed longitudinally from the load carrying body by merely sliding the panels 36 longitudinally and depending upon the width of the bottom of the body, the bottom may be either inclined toward the center for complete unloading or it may be necessary for a person to move the material inwardly in order to absolutely unload every bit of material in the load carrying body. For normal operation, a sufficient quantity of the material will be unloaded through the tunnel to enable efficient operation without manually unloading any of the material which may become disposed on the portions of the body 18 outwardly of the tunnel 20.

The blower assembly 40 includes a housing 42 having a rotatable fan 44 therein driven from a suitable drive spindle 46. The housing 44 has an enlarged opening 48 therein communicating with the housing 30 and a closure plate 50 is provided for the opening 48 and the closure plate 50 extends downwardly through a slot 52 in the housing 30 and is provided with a handle 54 for enabling removal thereof so that the blower housing may be selectively communicated with the housing 30 and the tunnel 20 in an obvious manner. For conveying lighter material, the tunnel 20 should be constructed without any movable belt.

The blower housing 42 is provided with an upwardly extending flexible discharge conduit or pipe 56 having a discharge end 58 which may be inserted over the top edge of the front end wall 16 for loading the load carrying body or it may be inserted into an opening 60 in a barn 62 or other storage area for conveying the material from the wagon body into the barn or other storage area. Also, the blower 40 is provided with ground engaging supporting wheels 64 or the like and a suitable pick-up mechanism may be disposed forwardly of the blower and communicated therewith whereby hay may be picked up from the ground surface and discharged into the load carrying body when the discharge pipe 56 is in the position illustrated in FIGURE 2 and the closure plate 50 is in position. This can be accomplished by duplicating the opening 48 on the front of the blower and providing a communication within a suitable hay pick up mechanism whereby the plate 50 may then be used either in front or in the rear of the blower housing as illustrated for enabling selective loading or unloading of the load carrying body. Also, the conveyor belt or conveyor floor 24 may be driven by any suitable means since this is only necessary in some instances and may be driven from a suitable traction type drive. Also, the blower may be driven by any suitable mechanism such as from a power take-off from a towing tractor or the like or from a self-propelled harvester or the like whereby the rotor may be rotated at a relatively high speed. The particular construction of the blade 44 may be varied for purposes of shredding the hay as well as conveying the same if desired.

FIGURE 6 illustrates a similar construction except that the bottom 18' includes a plurality of relatively short panels 70 hingedly attached thereto by hinges 72. The panels 70 are substantially one-half the size of the panels 36 and they rest upon transverse cross members 74 whereby the panel 70 may be opened as illustrated in FIGURE 6 for communicating the interior of the load carrying body with the pneumatic suction tunnel in the same manner as the panel 36 and for the same purposes. The control of the area of communication enables a control for the velocity of air passing therethrough since the volume of the blower will be substantially constant thereby enabling various types of materials to be effective entrained in the high velocity air.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An unloader comprising a mobile load carrying body, an open top elongated pneumatic conveying tunnel extending beneath the bottom of said body and opening upwardly thereinto, a plurality of closure panels spaced, longitudinally along said tunel and forming a closure for the top of the tunnel, said closure panels being vertically spaced a substantial distance above the bottom of said tunnel whereby said tunnel may have a substantial quantity of loose material disposed therein while still also defining an air passage, said closure panels being individually selectively removable for communicating a selected area of the load carrying body with a corresponding portion of said tunnel, and a pneumatic blower communicated with one end of the tunnel for conveying and pulling material from the load carrying body by suction, said blower including a discharge spout for discharging material into a storage area.

2. The combination of claim 1 wherein the bottom of said tunnel is formed by a movable conveyor belt for conveying material longitudinally thereof when heavier material is to be conveyed.

3. The combination of claim 1 wherein said blower includes a housing communicated with said one end of said tunnel and provided with a closure plate for selectively communicating the blower housing with the tunnel.

4. The combination of claim 1 wherein said closure panels are longitudinally slidably mounted in the bottom of the load carrying body for selectively opening certain areas of the tunnel.

5. The combination of claim 1 wherein said closure panels include hinged portions attached to the bottom of the load carrying body for enabling opening thereof thus providing for communication with the interior of the load carrying body.

References Cited by the Examiner

UNITED STATES PATENTS

| 2,107,682 | 2/38 | Wall | 214—521 |
|---|---|---|---|
| 2,116,603 | 5/38 | Holly | 214—83.28 |
| 2,534,266 | 12/50 | Howe | 214—83.28 |
| 2,865,521 | 12/58 | Fisher et al. | 214—83.28 |
| 3,049,251 | 8/62 | Glew | 214—83.36 |

HUGO O. SCHULZ, *Primary Examiner.*

MORRIS TEMIN, *Examiner.*